(12) United States Patent
Poynter

(10) Patent No.: US 6,606,116 B1
(45) Date of Patent: Aug. 12, 2003

(54) METHODS AND APPARATUS FOR ASSESSING QUALITY OF INFORMATION DISPLAYS

(75) Inventor: William Douglas Poynter, Duluth, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/539,135

(22) Filed: Mar. 30, 2000

(51) Int. Cl.⁷ .................... H04N 17/00; H04N 17/02
(52) U.S. Cl. .................. 348/189; 348/180; 348/191; 348/181; 348/184; 345/173; 345/178
(58) Field of Search ................. 348/180, 181, 348/182, 183, 184, 189, 191; 345/173, 178

(56) References Cited

U.S. PATENT DOCUMENTS

| | | | | |
|---|---|---|---|---|
| 4,415,921 A | | 11/1983 | Mulvanny et al. ........... 358/139 |
| 4,439,735 A | * | 3/1984 | Alvite et al. ................. 324/404 |
| 4,533,950 A | * | 8/1985 | Harshbarger ................. 348/189 |
| 4,754,329 A | * | 6/1988 | Lindsay et al. .......... 324/121 R |
| 4,884,102 A | * | 11/1989 | Terashita ...................... 355/35 |
| 5,140,418 A | | 8/1992 | Rivamonte .................. 358/139 |
| 5,351,201 A | | 9/1994 | Harshbarger, Jr. et al. .. 364/551 |
| 5,369,432 A | * | 11/1994 | Kennedy ..................... 345/600 |
| 5,440,339 A | * | 8/1995 | Harrison et al. ............. 348/177 |
| 5,440,379 A | | 8/1995 | Hayamizu ................... 355/271 |
| 5,526,043 A | | 6/1996 | Wen ............................ 348/189 |
| 5,537,145 A | * | 7/1996 | Miseli ......................... 345/904 |
| 5,638,461 A | * | 6/1997 | Fridge ......................... 382/141 |
| 5,650,844 A | * | 7/1997 | Aoki et al. .................. 348/180 |
| 5,670,985 A | * | 9/1997 | Cappels et al. ............. 345/207 |
| 5,708,460 A | * | 1/1998 | Young et al. ............. 178/18.03 |
| 5,754,222 A | | 5/1998 | Daly et al. .................. 348/184 |
| 5,760,829 A | * | 6/1998 | Sussmeier ................... 348/126 |
| 5,764,209 A | * | 6/1998 | Hawthorne et al. ........... 345/87 |
| 5,786,803 A | * | 7/1998 | Hernandez et al. ........... 345/22 |
| 5,801,768 A | * | 9/1998 | Sudo et al. ................. 315/11.5 |
| 6,163,402 A | * | 12/2000 | Chou et al. ................... 353/74 |
| 6,252,626 B1 | * | 6/2001 | Buckley et al. ............. 348/180 |
| 6,275,257 B1 | * | 8/2001 | Tallman et al. ............. 324/115 |
| 6,330,026 B1 | * | 12/2001 | Chan .......................... 348/180 |
| 6,392,657 B1 | * | 5/2002 | Hilliard et al. ............. 345/589 |

FOREIGN PATENT DOCUMENTS

JP          05328339        * 12/1993

* cited by examiner

Primary Examiner—Michael H. Lee
Assistant Examiner—Linus H. Lo
(74) Attorney, Agent, or Firm—Priest & Goldstein, PLLC; Paul W. Martin

(57) ABSTRACT

Techniques for quantitatively assessing the visual quality of information displays are described. A group of flat panel displays are tested to produce quantitative visual test data to allow an assessment of the visual quality of each of the flat panel displays. In one aspect, eight key photometric indices of visual quality are produced. Additionally, composite indices composed to two or more individual photometric indices are provided.

5 Claims, 5 Drawing Sheets

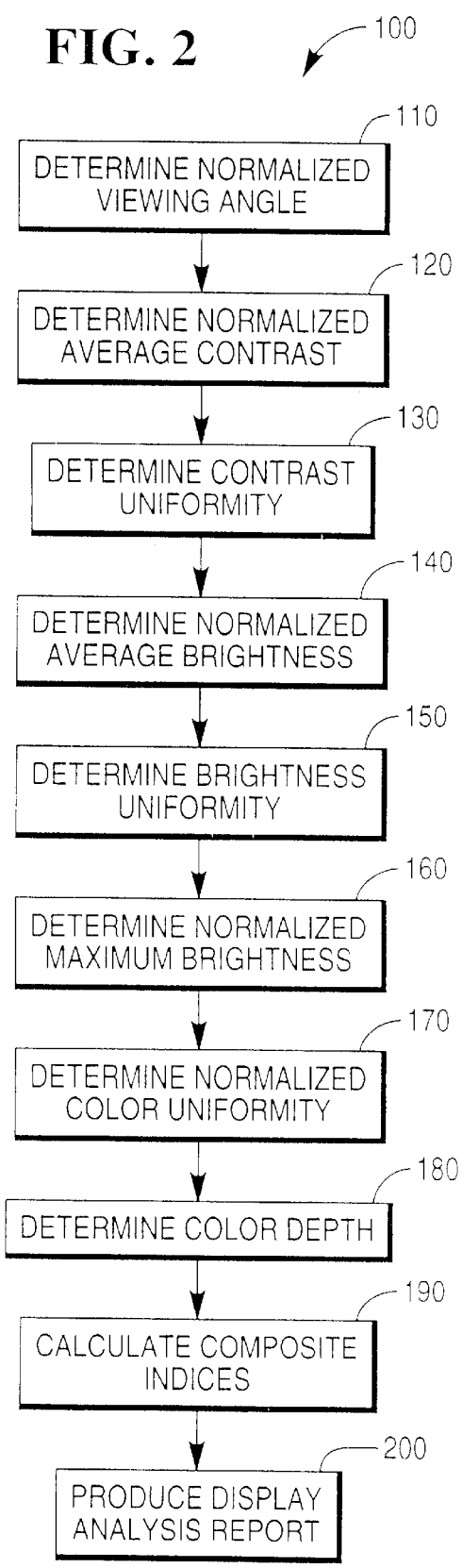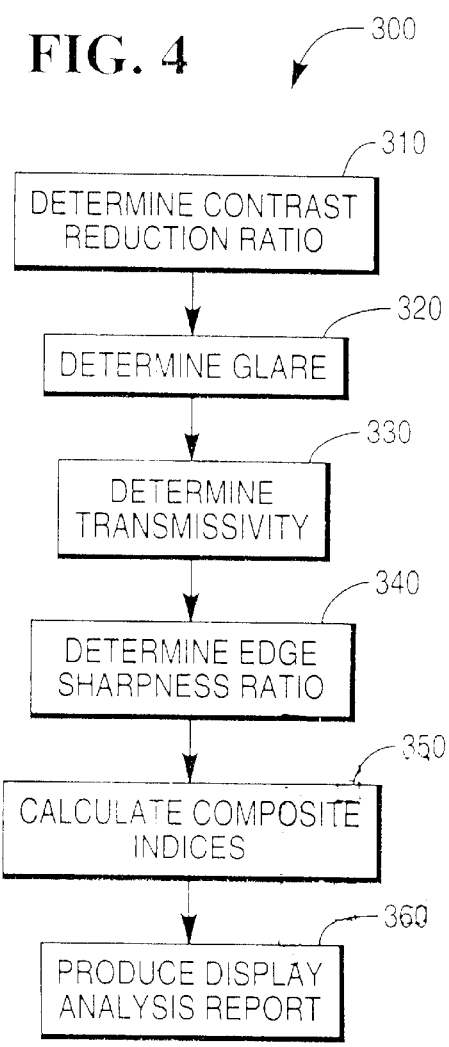

FIG. 3

Display Performance Analysis

Display Size 10.4 VGA
Display type DSTN

Visual Quality Metrics

| Display | Viewing Angle (degrees) | Average Contrast (max/min) | Contrast Uniformity | Average Brightness (nits) | Max. Brightness (nits) | Brightness Uniformity | Color Depth | Color Uniformity | Multi-parameter Quality Metrics (3-8 parameters) ||||||
|---|---|---|---|---|---|---|---|---|---|---|---|---|---|---|
| | | | | | | | | | 3* | 5** | 6*** | 7**** | 8***** |
| Winning Competitor | 100% | 61% | 78.9% | 88% | 83% | 100.0 | 100.0 | 76.4% | 100% | 100% | 100% | 100% | 100% |
| Competition B | 96% | 58% | 74.0% | 74% | 100% | 74.9% | 73.5% | 75.6% | 92% | 88% | 93% | 87% | 87% |
| Competition C | 94% | 44% | 68.2% | 62% | 90% | 76.0% | 76.0% | 100.0 | 80% | 80% | 85% | 86% | 86% |

\* normalized composite of viewing angle, average contrast, avg brightness

\*\* normalized composite of viewing angle, average contrast, contrast uniformity, avg brightness, brightness uniformity \*\*\* normalized composite of viewing angle, average contrast, contrast uniformity, avg brightness, brightness uniformity, max. brightness \*\*\*\* normalized composite of viewing angle, average contrast, contrast uniformity, avg brightness, brightness uniformity, color depth, color \*\*\*\*\* normalized composite of viewing angle, average contrast, contrast uniformity, avg brightness, brightness uniformity, max. brightness, color depth, color uniformity

Touchscreen Performance Analysis

Visual Quality Metrics

| Display | Transmissivity (%) | Contrast Ratio | Edge Sharpness | Glare (nits) | Multi-parameter Quality Metrics (2-3 parameters) | |
|---|---|---|---|---|---|---|
| | | | | | 2* | 3** |
| Winning Competitor | 100% | 78.9% | 83% | 100.0 | 100% | 100% |
| Competition B | 96% | 74.0% | 100% | 92% | 88% | 93% |
| Competition C | 94% | 68.2% | 90% | 76.0% | 80% | 85% |

\*   normalized composite of Contrast, Transmissivity, Edge sharpness

\*\*  normalized composite of Contrast, Transmissivity, Edge sharpness, Glare

— 600

METHODS AND APPARATUS FOR ASSESSING QUALITY OF INFORMATION DISPLAYS

FIELD OF THE INVENTION

The present invention relates generally to improvements in assessing the quality of information displays. More specifically, the present invention relates to providing methods and apparatus for quantitatively assessing the visual quality of information displays such as liquid crystal displays.

BACKGROUND OF THE INVENTION

Flat panel displays, such as liquid crystal displays (LCDs), are the primary user interface device and one of most costly components of point of sale (POS) terminals. Although LCD technology has improved recently, the contrast, brightness and color of a LCD vary with viewing angle. The usability of a POS terminal is directly influenced by the visual quality of the information display. However, display specifications provided by manufacturers of displays are typically the only measure available to assess display quality.

Several problems can occur by solely using these specifications to evaluate display quality. For example, there is currently no standard measurement methodology utilized across the display industry. Thus, various test measurements are not directly comparable among the suppliers of flat panel displays. Additionally, visual quality is affected by factors other than those measured and published in supplier specification documents, leaving these published factors as insufficient measures of visual quality.

Therefore, it would be desirable to provide a system and method for producing a quantitative assessment of the visual quality of a group of flat panel displays.

SUMMARY OF THE INVENTION

The present invention advantageously provides methods and apparatus for quantitatively assessing the visual quality of information displays. According to one aspect of the present invention, a quantitative assessment of a group of information displays is provided. The present invention advantageously provides engineers and product managers with a system and method to quantify the photometric dimensions which have the largest impact on human perception, and the legibility and aesthetic quality of information displays. In a preferred embodiment, the present invention allows system designers to compare competing display by providing eight key quantitative photometric indices of visual quality. Additionally, composite indices composed of two or more of the individual indices are provided.

A more complete understanding of the present invention, as well as further features and advantages of the invention, will be apparent from the following detailed description and the accompanying drawings.

BRIEF DESCRIPTION OF THE DRAWINGS

FIG. 2 shows a method of producing a quantitative assessment of a flat panel display in accordance with the present invention;

FIG. 3 shows an exemplary quantitative assessment report of a group of flat panel displays in accordance with the present invention;

FIG. 4 shows a method of producing a quantitative assessment of a flat panel display with a touchscreen or protective lens in accordance with the present invention;

FIG. 6 shows an exemplary quantitative assessment report of a group of touchscreen flat panel displays in accordance in accordance with the present invention.

DETAILED DESCRIPTION

Figure 1:
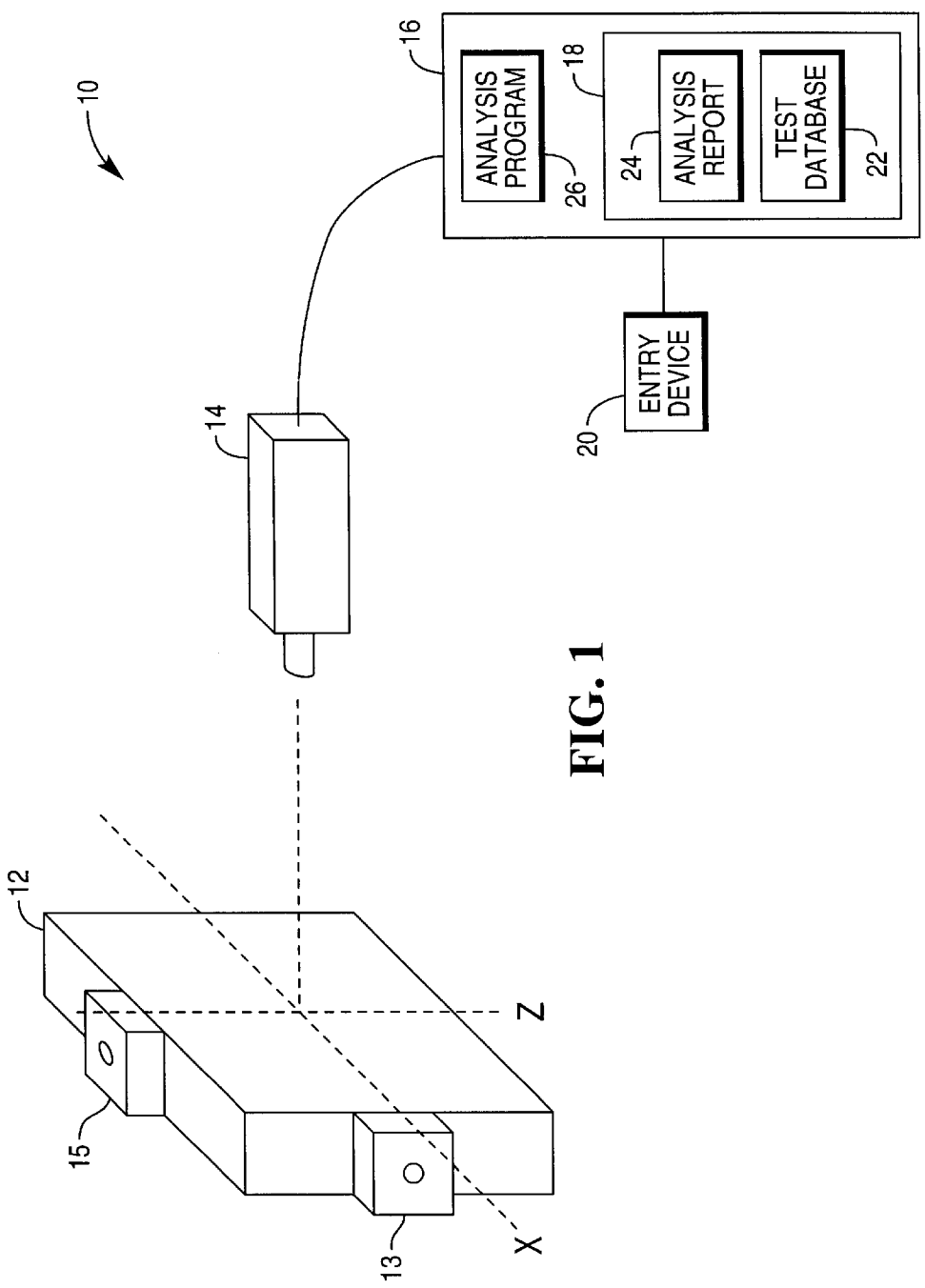
FIG. 1 shows a visual display test system in accordance with the present invention.

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

As an initial matter, some of the terms used in describing the present invention will be defined. As described in 1976 by the International Commission on Illumination, also know as the Commission Internationale de l'Eclairage, or CIE, color space coordinates represent visual color as points in a three dimensional coordinate system. Two of the three dimensions represent the color of a light source, such as red, green or blue. A method for determining the 1976 U'V' color coordinates described by the CIE involves filtering the power distribution of a light source with the sensitivity distributions of the three color receptors in a human eye. The color of a light source is therefore represented as a point in a two dimensional plane. The third dimension of color space, luminance, represents a visual brightness of a light source and is typically measured in foot-Lamberts or candles/meter$^2$.

Luminance contrast is the ratio of two luminance levels. A human eye resolves visual images by sensing patterns of luminance contrast. For example, the letters that compose this paragraph are composed of low luminance black lines on a high luminance background of white. The contrast between the black lines on the white background is what enables the eye to see the letters. Thus, contrast and brightness of a visual display are primary determinants of visual quality as it affects determining the legibility of information displayed. Contrast and brightness also affect the aesthetic quality of the display. Generally, the higher the brightness and the contrast, the better the visual quality.

Typical light emitting displays produce colors by combining the light from three primary colors, such as red, green and blue. For example, light that is perceived as yellow is actually a combination of red and green light emitted from the display. The CIE color space coordinates of these three primary colors form a triangle in the two dimensional plane of color space that represents perceptual color of a light source, with the third dimension representing perceptual brightness. The area of this triangle therefore represents the variety of color that a given display is capable of producing. A display with a large area triangle can produce a large, rich variety of color, allowing the display to more accurately represent true color. The richer the color set the display is capable of producing, represented by the area of the color space triangle, the more visually attractive the display and the higher its rated quality. Further details are contained in "Color Science: Concepts and Methods, Quantitative Data and Formaule" by G. Wyszecki and W. S. Stiles, which is hereby incorporated by reference in its entirety.

The technology of liquid crystal displays is such that the contrast, brightness, and color of the display varies depending upon the angle at which the display is viewed. When the display is viewed directly along a vector that is perpendicular to the display surface, the contrast, brightness, and trueness of the colors are typically at a maximum. As a viewer's line of sight increasingly deviates from this perpendicular viewing angle, contrast, brightness, and trueness of color all decrease. Therefore, the higher the variance of contrast, brightness, and color with deviation angle, the worse the perceived quality of the display.

FIG. 1 shows a diagram of a visual display test system 10 in accordance with the present invention. The test system 10 includes display 12 disposed at a predetermined distance from a photometer 14. A photometer suitable for use with the present invention is the PR-900 Video Photometer produced by PhotoResearch Inc. The display 12 is one of a plurality of displays to be tested. The system 10 also includes a test computer 16. In a preferred embodiment, test results from the photometer 14 are entered into the computer 16 using an entry device 20. In an alternate embodiment, the photometer 14 is communicatively connected to the computer 16, allowing test results to be downloaded directly to the computer 16. The computer 16 includes a memory device 18 which includes a test data database 22 and a display analysis report 24. An analysis program module 26 is executed by the computer 16.

As described further below, the photometer 14 measures multiple characteristics of the display 12, including contrast, luminance and CIE color coordinates. As seen in FIG. 1, these measurements are conducted while the photometer 14 is focused on the center of the display 12 while the display 12 is rotated about a horizontal axis (X) and a vertical axis (Z) by a turning element 13 and a turning element 15, respectively, to simulate a variety of viewing angles. In an alternate embodiment, the photomometer 14 may be moved while the display 12 is fixed. The test results from the photometer 14 are stored in the test data database 22. Analysis program module 26 creates the report 24 utilizing the test database 22.

FIG. 2 shows a method 100 for producing a quantitative assessment of an information display, such as display 12, which is one of a plurality of displays tested. The method 100 tests the optical and visual qualities which have been empirically correlated with subjective judgments of quality.

In step 110, a normalized viewing angle of the flat panel display is determined. A photometer, such as photometer 14, is focused on the center of the display at a viewing angle perpendicular to the surface the display. At this angle, luminance contrast is typically a maximum. A plurality of viewing angles are determined at which the luminance contrast decreases to a predetermined value, such as 7.0. An average view angle is calculated by averaging the measured viewing angles. The average view angle is divided by the maximum average viewing angle of all the tested displays, yielding a normalized average viewing angle. The normalized average viewing angle is a measure from 0% to 100% which indicates quantitatively how the display 12 performed with respect to all the displays tested, with 100% indicating that the display achieved the maximum viewing angle of all the tested displays. Alternatively, normalization may be performed with respect to a fixed standard.

In step 120, a normalized average contrast of the flat panel display is determined. First, luminance contrast is measured at a plurality of predetermined viewing angles. An average contrast is calculated by averaging the measured luminance contrast values measured. The normalized average contrast is calculated by dividing the average contrast by the maximum average contrast of all the tested displays. The normalized average contrast is a measure from 0% to 100% which indicates quantitatively how the display 12 performed with respect to all the displays tested.

In step 130, a normalized average contrast weighted by uniformity, also referred to as contrast uniformity, of the flat panel display is determined. First, luminance contrast is measured at a plurality of predetermined viewing angles. An average contrast is calculated by averaging the measured luminance contrast values. A standard deviation of the measured luminance contrast values is also calculated. Next, a weighted average contrast is calculated by dividing the average contrast by the standard deviation. The normalized average contrast weighted by uniformity is calculated by dividing the weighted average contrast by the maximum weighted average contrast of the tested displays. The contrast uniformity is a measure from 0% to 100% which indicates quantitatively how the display 12 performed with respect to all the displays tested.

In step 140, a normalized average brightness of the flat panel display is determined. First, luminance is measured at a plurality of predetermined viewing angles. Next, an average luminance is calculated by averaging the measured luminance values. A normalized average luminance is calculated by dividing the average luminance by the maximum average luminance measured of the tested displays. The normalized average luminance is a measure from 0% to 100% which indicates quantitatively how the display 12 performed with respect to all the displays tested.

In step 150, a normalized average brightness weighted by uniformity, also referred to as brightness uniformity, of the flat panel display is determined. First, luminance is measured at a plurality of predetermined viewing angles. Next, an average luminance is calculated by averaging the measured luminance values. A standard deviation of the measured luminance values is also calculated. Next, a weighted average luminance is calculated by dividing the average luminance by the standard deviation. The brightness uniformity is calculated by dividing the weighted average luminance by the maximum average luminance of the other displays tested. The brightness uniformity is a measure from 0% to 100% which indicates quantitatively how the display 12 performed with respect to all the displays tested.

In step 160, a normalized maximum brightness of the flat panel display is determined. First, the display is adjusted to maximum brightness and maximum luminance contrast. Next, a maximum luminance is measured. The normalized maximum brightness is calculated by dividing the maximum luminance by the highest maximum luminance of the other displays tested. The normalized maximum brightness is a measure from 0% to 100% which indicates quantitatively how the display 12 performed with respect to all the displays tested.

In step 170, a normalized color uniformity of the flat panel display is determined. First, the 1976 U'V' color coordinates of each of the red, green, blue, black and white colors is measured at a perpendicular viewing angle and at a plurality of other predetermined viewing angles. Next, the distance in color space between the perpendicular color coordinates and the color coordinates measured at the predetermined viewing angles is calculated for each of the colors. The average of the calculated distances is then determined. This average distance, or color migration, is a measure of the average color shift seen at the predetermined viewing angles. Next, the normalized color uniformity is calculated by dividing the minimum color migration of the displays tested by the color migration of the current display. The normalized color uniformity is a measure from 0% to 100% which indicates quantitatively how the display 12 performed with respect to all the displays tested.

In step 180, a normalized color production capability, or color depth, of the flat panel display is determined. First, the 1976 U'V' color coordinates of the red, green and blue colors are measured at a perpendicular viewing angle. Next, a color depth is calculated by determining the area of the triangle formed by 1976 U'V' color coordinates of the red, green and blue colors. The normalized color depth is calculated by dividing the maximum color depth of the other displays tested by the color depth of the current display. The normalized color depth is a measure from 0% to 100% which indicates quantitatively how the display 12 performed with respect to all the displays tested.

In step 190, a plurality of normalized composite indices, or multi-parameter quality metrics, are calculated. For example, a normalized composite index may suitably include normalized view angle and normalized average contrast. To determine such a composite index, the average of the normalized view angle and the normalized average contrast is calculated for each display tested. Then the average value for each display is divided by the maximum value of the displays tested, yielding the composite index.

In step 200, a display analysis report is produced by display analysis report generator 26. FIG. 3 shows an exemplary display analysis report 301 in accordance with the present invention.

A touchscreen or protective lens attached to an LCD typically degrades the visual quality of display images by reducing optical transmissivity, contrast, and edge sharpness, and by increasing the amount of glare. FIG. 4 shows a method 300 of producing a quantitative assessment of a flat panel display including a touchscreen or protective lens.

In step 310, a contrast reduction ratio of the flat panel display is determined. Touchscreens typically degrade contrast in the presence of overhead lighting. To quantify this effect a first contrast ratio is measured in the center of the display under an illumination level typical of the environment where the display will be used. In a preferred embodiment, the illumination level is 28 foot-candles produced by banks of cool white florescent ceiling lights. The measurement is made along a vector perpendicular to the display surface. The touchscreen is placed in front of the display being tested and a second contrast ratio is measured. The contrast reduction ratio is then calculated by dividing the second ratio by the first ratio. The contrast reduction ratio may suitably be normalized with respect to the best performing touchscreen display.

In step 320, a glare parameter of the flat panel display is determined. In a preferred embodiment, the glare is measured under the illumination conditions described above in step 310. The display is set an angle which allows the capture of specular reflections from the overhead lights and the luminance of the specular reflections is determined. The luminance of the specular reflections is the physical correlate of glare. The glare may suitably be normalized with respect to the best performing touchscreen display.

In step 330, a transmissivity parameter of the flat panel display is determined. Touchscreens typically reduce the brightness of flat panel displays because they are not completely transmissive or transparent. The transmissivity parameter of the touchscreen is measured along a vector perpendicular to the surface of the display and may suitably be normalized with respect to the best performing touchscreen display.

Figure 5A:
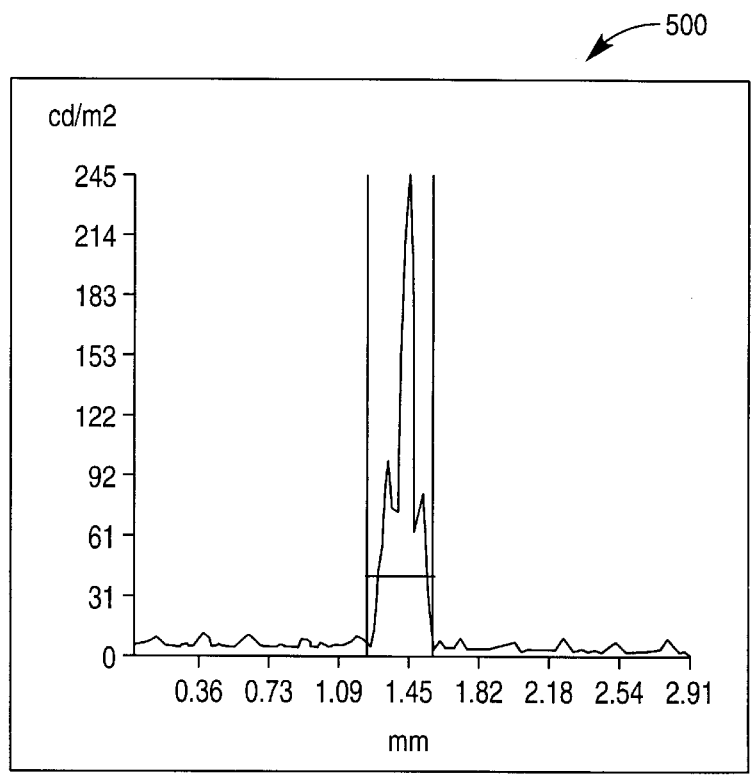
FIGS. 5A and 5B show exemplary graphs of pixel width profiles.
Figure 5B:
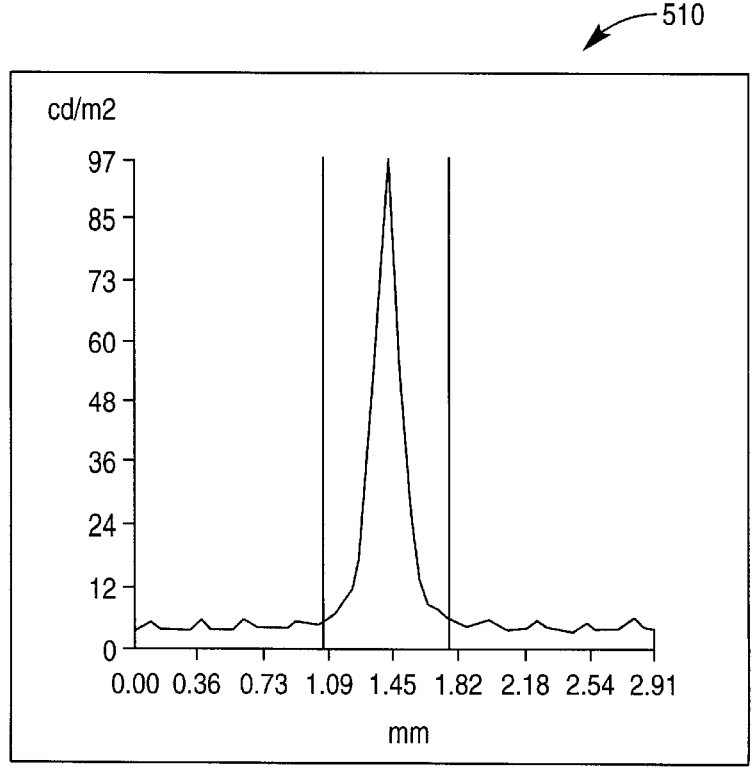

In step 340, an edge sharpness ratio of the flat panel display is determined. Touchscreens typically degrade image quality by reducing the sharpness of the cutoff between light and dark areas of the image, or in other words, the sharpness of luminance edges. This degradation has the effect of making images look fuzzy instead of sharp and crisp. The width of an optical profile of a pixel column of the display is one suitable measure of edge sharpness. FIG. 5A shows an exemplary photometric profile 500 of a flat panel display without a touchscreen. FIG. 5B shows an exemplary photometric profile 510 of a flat panel display with a touchscreen. The edge sharpness ratio is calculated as the ratio of the width of the profile with a touchscreen to the ratio of the width of the profile without a touchscreen. The edge sharpness ration may suitable be normalized with respect to the best performing touchscreen display.

In step 350, a plurality of composite indices, or multi-parameter quality metrics, are calculated. For example, a normalized composite index may suitably include contrast reduction ratio and edge sharpness.

In step 360, a display analysis report is produced by display analysis report generator 26. FIG. 6 shows an exemplary display analysis report 600 for a group of touchscreen displays in accordance with the present invention.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents. For example, the methods and apparatus of the present invention are suitable for the testing and assessment of a variety of displays types, including cathode ray tube (CRT) displays and other display types.

I claim:

1. A test system for producing quantitative visual test data for a group of flat panel displays to allow objective comparisons of visual quality between each of the flat panel displays, the system comprising:

a test device for performing a plurality of quantitative photometric tests on each flat panel display;

a rotatable means for varying a viewing angle between the test device and a plane of a display under test, including
a first turning element attached to the display under test, the first turning element operable to rotate the display under test about a vertical axis; and
a second turning element attached to the display under test, the second turning element operable to rotate the display under test about a horizontal axis;

wherein the test device measures the display under test at varying viewing angles; and a computer for
calculating a photometric index for each of the quantitative photometric tests for each flat panel display, each photometric index providing an objective measure of the visual quality of each flat panel display; and
producing a report comprising the plurality of photometric indices of each flat panel display.

2. The method in claim 1,
wherein the group of displays comprises displays manufactured by different manufacturers; and wherein the produced report further comprises a ranking of the displays in the group based on the photometric indices which match specific display environment requirements.

3. A method of producing a quantitative visual assessment of a group of flat panel displays having removable touchscreens or protective lenses to be evaluated and to allow objective comparisons of visual qualities of the flat panel displays, the method comprising the steps of:

measuring contrast reduction ratios of the group of flat panel displays including the steps of measuring first contrast ratios along a perpendicular line with each of the group of displays in the presence of fluorescent lights, each of the group of displays having the touchscreen or protective lens removed;

measuring second contrast ratios along the perpendicular line with each of the group of displays in the presence of the fluorescent lights, each of the group of displays having the touchscreen or protective lens attached;

dividing the second contrast ratios by the first contrast ratios to produce the contrast reduction ratios; and normalizing the contrast reduction ratios with respect to a largest contrast reduction ratio determined out of all the group of displays;

measuring glare parameters of the group of flat panel displays;

measuring transmissivity parameters of the group of flat panel displays;

measuring edge sharpness ratios of the group of flat panel displays;

calculating composite indices of at least two of the previous measuring steps; and automatically producing a display analysis report displaying measurements of the group of flat panel displays for quality assessment.

4. A method of producing a quantitative visual assessment of a group of flat panel displays having removable touchscreens or protective lenses to be evaluated and to allow objective comparisons of visual qualities of the flat panel displays, the method comprising the steps of:

measuring contrast reduction ratios of the group of flat panel displays;

measuring glare parameters of the group of flat panel displays including the steps of setting each of the group of displays at an angle which allows capture of specular reflections from overhead lights;

measuring luminance values of the specular reflections to produce the glare parameters; and normalizing the glare parameters with respect to a largest glare parameter determined out of all the group of displays;

measuring transmissivity parameters of the group of flat panel displays;

measuring edge sharpness ratios of the group of flat panel displays;

calculating composite indices of at least two of the previous measuring steps; and automatically producing a display analysis report displaying measurements of the group of flat panel displays for quality assessment.

5. A method of producing a quantitative visual assessment of a group of flat panel displays having removable touchscreens or protective lenses to be evaluated and to allow objective comparisons of visual qualities of the flat panel displays, the method comprising the steps of:

measuring contrast reduction ratios of the group of flat panel displays;

measuring glare parameters of the group of flat panel displays;

measuring transmissivity parameters of the group of flat panel displays;

measuring an edge sharpness ratio for each of the group of flat panel displays including the steps of measuring a first width of an optical profile of a pixel column for each of the group of displays with the touchscreen or protective lens removed from each of the group of displays;

measuring a second width of the optical profile of the pixel column for each of the group of displays with the touchscreen or protective lens attached to each of the group of displays;

calculating the edge sharpness ratio by dividing the first width by the second width; and normalizing the edge sharpness ratio by considering a largest sharpness ratio determined out of all the group of displays;

calculating composite indices of at least two of the previous measuring steps; and automatically producing a display analysis report displaying measurements of the group of flat panel displays for quality assessment.

* * * * *